US012673291B1

(12) United States Patent
Simundson

(10) Patent No.:  US 12,673,291 B1
(45) Date of Patent:  Jul. 7, 2026

(54) DESICCANT ROTOR

(71) Applicant: Bjorn D Simundson, Goleta, CA (US)

(72) Inventor: Bjorn D Simundson, Goleta, CA (US)

( * ) Notice: Subject to any disclaimer, the term of this patent is extended or adjusted under 35 U.S.C. 154(b) by 314 days.

(21) Appl. No.: 18/631,547

(22) Filed: Apr. 10, 2024

Related U.S. Application Data

(60) Provisional application No. 63/458,819, filed on Apr. 12, 2023.

(51) Int. Cl.
  *B01D 53/06*      (2006.01)
  *B01D 53/26*      (2006.01)
  *B33Y 80/00*      (2015.01)
  *F24F 3/14*       (2006.01)
(52) U.S. Cl.
  CPC ........... B01D 53/06 (2013.01); B01D 53/261 (2013.01); B33Y 80/00 (2014.12); F24F 3/1423 (2013.01); *B01D 2257/80* (2013.01); *B01D 2259/40096* (2013.01); *F24F 2203/1032* (2013.01)
(58) Field of Classification Search
  CPC .... B01D 53/04; B01D 53/0454; B01D 53/06; B01D 53/261; B01D 2257/80; B01D 2259/40096; B33Y 80/00; F24F 3/1423; F24F 2203/1032
  USPC ............................................... 95/113; 96/125
  See application file for complete search history.

(56) References Cited

U.S. PATENT DOCUMENTS

| | | | |
|---|---|---|---|
| 10,145,572 B2 | 12/2018 | Dinnage et al. | |
| 2013/0061756 A1* | 3/2013 | Hung ................. | B01D 53/0438 |
| | | | 96/126 |
| 2018/0361352 A1* | 12/2018 | Gross ................. | B01J 20/28073 |
| 2022/0062858 A1* | 3/2022 | Cui ............................ | C08J 3/24 |
| 2024/0139705 A1* | 5/2024 | Gupta .................... | B01D 53/62 |
| 2024/0198283 A1* | 6/2024 | Arnell .................... | B33Y 50/02 |
| 2024/0317026 A1* | 9/2024 | Saito ...................... | B60H 3/024 |
| 2025/0058308 A1* | 2/2025 | Shen ........................ | B01J 21/18 |

FOREIGN PATENT DOCUMENTS

WO      WO-2022061392 A1 *  3/2022  .......... B01J 20/3236

* cited by examiner

*Primary Examiner* — Frank M Lawrence, Jr.
(74) *Attorney, Agent, or Firm* — Gugliotta & Gugliotta LPA

(57)      ABSTRACT

An improved desiccant rotor is provided that uses a three-dimensional printed joule heating structure to heat the desiccant directly, thereby improving its efficiency. The heating structure is printed as the substrate itself using additive manufacturing techniques, allowing for unique rotor configurations and better performance in a smaller size. The desiccant is coated on and within the porous heating structure and is in direct contact with it. The heating structure generates heat that is transferred directly to the desiccant, resulting in better moisture removal. The porosity and configuration of the heating structure can be varied to achieve different heating levels and rotor designs. In one embodiment, the desiccant is mixed directly into the conductive ink used to print the heating structure for even greater heat flux. The desiccant rotor may also include sensors and controllers to monitor humidity and adjust heating levels accordingly to maintain consistent dehumidification.

18 Claims, 1 Drawing Sheet

GOAL.
USE JOULE HEATING EMBEDDED TO THE SUBSTRATE TO HEAT THE DESICCANT DIRECTLY, THUS ELIMINATING WASTED HEAT FROM THE DESICCANT REACTIVATION CYCLE

[REACTIVATION AIR CYCLE]

Hot dry air in

Cool dry air out

ROTATION

Moist air out

Moist air in

[PROCESS AIR CYCLE]

[ DETAIL ]

Desiccant material

Printable joule heating element

Substrate base layer

GOAL.
USE JOULE HEATING
EMBEDDED TO THE
SUBSTRATE TO HEAT
THE DESICCANT
DIRECTLY, THUS
ELIMINATING WASTED
HEAT FROM THE
DESICCANT REACTIVATION
CYCLE

DESICCANT ROTOR

RELATED APPLICATIONS

The present application claims the benefit of U.S. Provisional Application 63/458,819, filed on 12 Apr. 2023, and incorporated by reference as if fully rewritten herein.

BACKGROUND OF THE INVENTION

1. Field of the Invention

The present invention relates to desiccant rotors, and more particularly, to a desiccant rotor that is improved by heating the desiccant directly using printable joule heating elements.

2. Description of the Related Art

Desiccant rotors are commonly used in various industries to remove moisture from the air. Typically, a desiccant rotor comprises a substrate and a desiccant coated on the substrate. The desiccant absorbs moisture from the air as it passes over the rotor, and then the rotor is rotated to a position where the desiccant is exposed to a flow of warm, dry air, which causes the desiccant to release the moisture. This process is repeated continuously to maintain a low humidity level in the air.

One challenge with conventional desiccant rotors is that the efficiency of the desiccant can be limited by the temperature of the air passing over the rotor. In some applications, the air may not be warm enough to fully release the moisture from the desiccant. By using hot air to dry out the desiccant from the outside in, inefficiencies exist in the thermal and mass transport.

SUMMARY OF THE INVENTION

The present invention provides a solution to the above-mentioned problem by heating the desiccant directly using printable joule heating elements. The printable joule heating elements are printed on the substrate, and the desiccant is coated on top of the heating elements. The heating elements generate heat that is transferred directly to the desiccant, thereby improving the efficiency of the desiccant rotor.

In one embodiment, the printable joule heating elements are made of a conductive material such as silver, copper or aluminum, and are printed on the substrate using a silkscreen printing or inkjet printing process. The thickness, width and length of the trace from anode to cathode contact combine to create the desired heat per volume of material used an area of material to create heating elements can be varied to achieve different heating levels.

In another embodiment, the desiccant is coated on top of the heating elements using a spraying or dipping process. The desiccant can be any suitable material, such as a silica gel, molecular sieve, metal-organic framework material or metal-organic/inorganic framework sorbent material and can be chosen based on the specific application requirements.

In yet another embodiment, the desiccant rotor further comprises a sensor for monitoring the humidity level of the air passing over the rotor, and a controller for adjusting the heating level of the printable joule heating elements based on the humidity level, direct variable heating, and driven automatically to achieve a desired performance (e.g., efficiency vs. maximum performance). This allows the desiccant rotor to maintain a consistent level of moisture removal regardless of variations in the temperature and humidity of the air.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figures 1, 2:
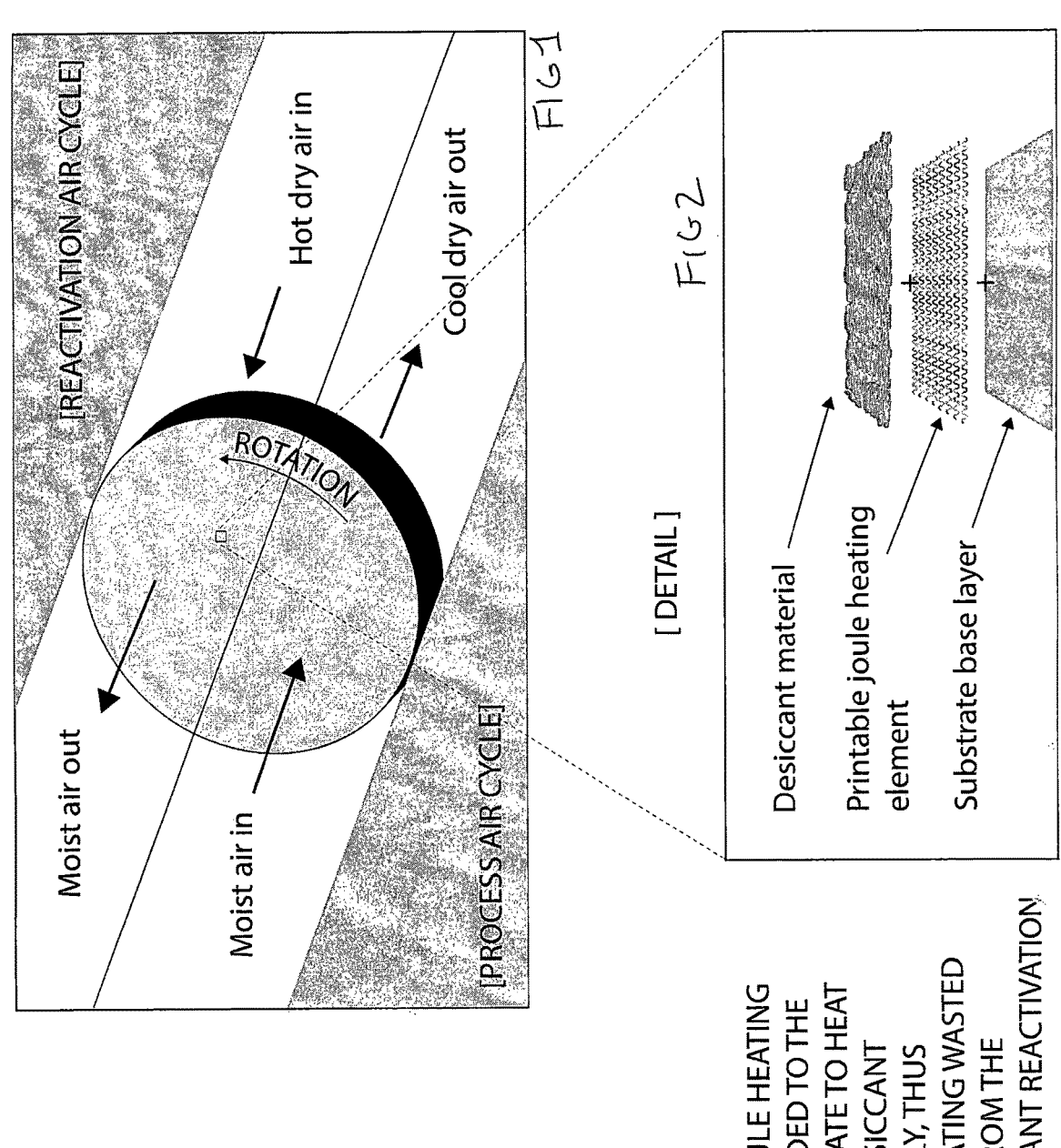
FIG. 1 is a schematic diagram of a desiccant rotor system incorporating the desiccant rotor of the present invention.
FIG. 2 is a cross-sectional view of a desiccant rotor according to one embodiment of the present invention.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The best mode for carrying out the invention is presented in terms of its preferred embodiment, herein depicted within the Figures.

1. Detailed Description of the Figures

Referring now to the drawings, wherein like reference numerals indicate the same parts throughout the several views, an improved desiccant rotor 100 is shown according to a preferred embodiment of the present invention. The desiccant rotor 100 comprises a three-dimensional printed joule heating structure 102 that acts as the substrate. A desiccant 104 is coated on and within the heating structure 102 and is in direct contact with it.

The three-dimensional printed joule heating structure 102 is made of a conductive material and is printed as the substrate itself using additive manufacturing techniques such as fused deposition modeling, selective laser sintering, stereolithography, and direct metal laser sintering. The conductive material may preferably be copper or aluminum, or more preferably silver. The structure is printed to have a porous configuration with integrated heating elements. The porosity and configuration of the heating structure 102 can be varied to achieve different heating levels and rotor designs.

The desiccant 104 is coated on and within the heating structure 102. The desiccant 104 can be any suitable material, such as a silica gel, molecular sieve, metal-organic framework material or metal-organic/inorganic framework sorbent material, and can be chosen based on the specific application. In an alternative embodiment, the desiccant 104 is mixed directly into the conductive ink used to print the heating structure 102.

2. Operation of the Preferred Embodiment

In operation, the teachings of the present invention improve upon this existing desiccant rotor technology by heating the desiccant directly through the use of a three-dimensional printed joule heating structure, which acts as the substrate itself, with the desiccant coated on and within the heating structure. This allows application of heat directly to the desiccant, which results in dramatically better efficiency. The unique printed configuration enables improved performance in a smaller size compared to conventional rotors.

The heating elements can be deactivated in the process air, thereby allowing the desiccant to rapidly cool and absorb moisture, and then activated when the rotor rotates into the reactivation airstream, thereby allowing faster and more precise control when compared to blasting it with hot air like current legacy systems. This also reduces or removes the need for the "cool-down" portion of the rotor, thus allowing wasted space on the wheel to be reclaimed.

Such improvements resolve the inefficiency of desiccant dehumidifiers and may make HVAC systems "greener" while operating with better and safer performance.

The embodiments illustrated or described herein were chosen to best explain the principles of the invention and its practical application, and to enable others skilled in the art to best utilize the invention in various embodiments and with various modifications as are suited to the particular use contemplated. Additional improvements, such as using the desiccant mixed directly into the conductive ink of the three-dimensional printed joule heating structure, may provide even better performance.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching.

The embodiments are chosen and described in order to best explain principles of the invention and its practical application, to thereby enable others skilled in the art to best utilize the invention and its various embodiments with various modifications as is suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

What is claimed is:

1. A desiccant rotor apparatus comprising:
   a three-dimensional printed joule heating structure acting as a substrate, wherein the heating structure comprises a porous configuration with integrated heating elements; and
   a desiccant coated on and within the three-dimensional printed joule heating structure, wherein the desiccant is in direct contact with the heating structure;
   wherein the three-dimensional printed joule heating structure is configured to generate heat that is transferred directly to the desiccant, thereby improving moisture removal efficiency of the desiccant rotor and enabling unique rotor configurations; and wherein the desiccant is mixed into a conductive ink used to print the three-dimensional joule heating structure.

2. The desiccant rotor apparatus of claim 1, wherein the three-dimensional printed joule heating structure comprises a conductive material selected from the group consisting of silver, copper, and aluminum.

3. The desiccant rotor apparatus of claim 1, wherein the desiccant is selected from the group consisting of silica gel, molecular sieve, metal-organic framework material, and metal-organic/inorganic framework sorbent material.

4. The desiccant rotor apparatus of claim 1, further comprising: a
   sensor configured to monitor a humidity level of air passing over the desiccant rotor; and
   a controller in communication with the sensor and the three-dimensional printed joule heating structure, the controller configured to adjust a heating level of the heating structure based on the monitored humidity level to maintain a consistent level of moisture removal.

5. The desiccant rotor apparatus of claim 1, wherein the porosity and configuration of the three-dimensional printed joule heating structure is selected to achieve different heating levels and rotor designs.

6. The desiccant rotor apparatus of claim 1, wherein the three-dimensional printed joule heating structure is configured to reduce a need for a cool down section between a regeneration air supply and a process air supply.

7. A method of using a desiccant rotor apparatus, the method comprising:
   providing a desiccant rotor apparatus comprising:
      a three-dimensional printed joule heating structure acting as a substrate, wherein the heating structure comprises a porous configuration with integrated heating elements; and
      a desiccant coated on and within the three-dimensional printed joule heating structure, wherein the desiccant is in direct contact with the heating structure;

passing a first airstream over the desiccant rotor apparatus, wherein the desiccant absorbs moisture from the first airstream;

rotating the desiccant rotor apparatus to expose the desiccant to a second airstream;

activating the three-dimensional printed joule heating structure to generate heat that is transferred directly to the desiccant, causing the desiccant to release the absorbed moisture into the second airstream; and deactivating the three-dimensional printed joule heating structure to allow the desiccant to cool and reabsorb moisture from the first airstream; wherein the desiccant is mixed into a conductive ink used to print the three-dimensional joule heating structure.

8. The method of claim 7, further comprising:

monitoring a humidity level of the first airstream using a sensor; and adjusting the heating level of the three-dimensional printed joule heating structure based on the monitored humidity level to maintain a consistent level of moisture removal.

9. The method of claim 7, wherein the first airstream is a process air supply, and the second airstream is a regeneration air supply.

10. A method of improving moisture removal efficiency of a desiccant rotor, the method comprising:

providing a desiccant rotor substrate;

printing a three-dimensional joule heating structure on the substrate using an additive manufacturing technique, wherein the heating structure comprises a porous configuration with integrated heating elements;

coating a desiccant on and within the three-dimensional printed joule heating structure, wherein the desiccant is in direct contact with the heating structure; and generating heat from the three-dimensional printed joule heating structure that is transferred directly to the desiccant, thereby improving moisture removal efficiency of the desiccant rotor and reducing a need for a cool down section between a regeneration air supply and a process air supply; wherein the desiccant is missed into a conductive ink used to print the three-dimensional joule heating structure.

11. The method of claim 10, wherein printing the three-dimensional joule heating structure comprises using a conductive material selected from the group consisting of silver, copper, and aluminum.

12. The method of claim 10, wherein coating the desiccant comprises using a material selected from the group consisting of silica gel, molecular sieve, metal-organic framework material, and metal-organic/inorganic framework sorbent material.

13. The method of claim 10, further comprising:

monitoring a humidity level of air passing over the desiccant rotor using a sensor; and adjusting the heating level of the three-dimensional printed joule heating structure based on the monitored humidity level to maintain a consistent level of moisture removal.

14. The method of claim 10, further comprising selecting the porosity and configuration of the three-dimensional printed joule heating structure to achieve different heating levels and rotor designs.

15. The desiccant rotor apparatus of claim 1, wherein the three-dimensional printed joule heating structure is printed using an additive manufacturing technique.

16. The method of claim 7, wherein activating and deactivating the three-dimensional printed joule heating structure allows for faster and more precise control of the desiccant rotor apparatus compared to using hot air alone.

17. The method of claim 10, wherein the additive manufacturing technique used to print the three-dimensional joule heating structure is selected from the group consisting of fused deposition modeling, selective laser sintering, stereolithography, and direct metal laser sintering.

18. The method of claim 10, wherein the three-dimensional printed joule heating structure enables unique rotor configurations and improved performance in a smaller size compared to conventional desiccant rotors.

* * * * *